United States Patent Office 3,053,809
Patented Sept. 11, 1962

3,053,809
PHOSPHINE-METAL COMPOUND CATALYST
Robert G. Linville, Summit, N.J., assignor to Celanese Corporation of America, New York, N.Y., a corporation of Delaware
No Drawing. Filed Apr. 15, 1958, Ser. No. 728,527
14 Claims. (Cl. 260—75)

The present invention relates to improvements in the production of linear polyesters and more particularly to catalytic processes for producing linear polyesters through condensation of an ester of a dicarboxylic acid and a glycol.

In one process for preparing filament- or film-forming linear polyesters such as polyethylene terephthalate, a monomeric ester of a dicarboxylic acid and a hydroxy compound (e.g. an alcohol or phenol) such as dimethyl terephthalate is reacted with a glycol such as ethylene glycol to effect ester interchange, thereby forming a hydroxy ester such as bis-2-hydroxyethyl terephthalate and splitting off methanol or other hydroxy compound. After this the temperature is raised to effect condensation to a linear polyester with liberation of the glycol. The reaction mixture, at least in the later stages, has a high melting point (e.g. above about 225° C. and, in the case of the glycol terephthalate, above about 255° C.), and it is necessary to use high temperatures (e.g. about 255–290° C.) to keep the mixture in the liquid condition. To permit the reactions to proceed within a reasonable time interval it has been proposed to add catalysts. Use of many of the catalysts suggested has resulted in products which, while of high molecular weight, are poor in color. Others give products whose color is good but whose molecular weight is too low for commercial use as fiber-forming materials.

It is an object of the present invention to provide novel catalysts for either or both the ester interchange and condensation reactions.

It is a further object of the invention to provide catalytic processes for the production of polyesters of high molecular weight and good color.

Other objects of the invention will become apparent from the detailed description of the invention which follows, wherein all parts and percentages are by weight unless otherwise expressed.

In accordance with one aspect of the invention the formation of polyesters is catalyzed by an organic phosphine and a metal compound. The organic phosphine itself does not catalyze the reactions to any substantial extent but its addition to the metal compound effects a pronounced improvement in the catalytic action of the latter. In fact, there is a pronounced catalytic effect even with metal compounds which have no substantial catalytic action of themselves.

The conditions of the polyester-forming reaction are conventional whether starting from the dimethyl terephthalate or from the intermediate bis-2-hydroxyethyl terephthalate. Specifically, in the ester interchange reaction of dimethyl terephthalate with ethylene glycol, the glycol is present ordinarily in at least molar proportions, preferably in the neighborhood of twice the molar proportion of the dimethyl terephthalate, although more or less glycol may be used. The materials are heated, preferably in an inert atmosphere, to a temperature at least sufficient to boil off the by-product methanol at the prevailing pressure. While the pressure may be sub-atmospheric or super-atmospheric, atmospheric pressure is adequate since the reaction proceeds at reasonable speed at moderate temperatures, e.g. 140°–230° C. although higher or lower temperatures may be employed. The by-product methanol is preferably removed as formed and the amount of methanol taken off is a measure of the extent to which the ester interchange has proceeded.

The product of the ester interchange reaction, which is generally bis-2-hydroxyethyl terephthalate mixed with low polymers, is then heated further, preferably in an inert atmosphere, to a temperature at which it will condense with liberation of ethylene glycol. The temperature is increased, preferably gradually, during this stage, e.g. to about 260 to 290° C., preferably to about 270 to 285° C. Vacuum is applied at least during the latter stages of the condensation to facilitate removal of by-product ethylene glycol.

The organophosphine may be added when the polycondensation is to be effected. The metal compound may be added at that stage or may already be present, having been added during or prior to, formation of the bis-2-hydroxyethyl terephthalate and low polyesters through ester interchange. Preferably, both the organophosphine and the metal compound are present during the ester interchange and are carried through to the condensation stage. The metal compound and the organophosphine may be added separately or they may be combined before they are added to the reactants.

Suitable organophosphines which may be used in the practice of the present invention include aryl phosphines, alkyl phosphines, alkaryl phosphines, aralkyl phosphines and derivatives thereof having inert substituents such as alkoxy radicals. Best results are achieved when the organophosphine is a (poly-organo)-phosphine, i.e. a secondary or tertiary phosphine wherein the phosphorus atom is attached directly to two or three organic radicals, preferably to three organic radicals. Representative organophosphines include triphenyl phosphine, tri-biphenyl phosphine, tri-butyl phosphine, phenyldibutylphosphine, 4 - phenoxyphenyldibutylphosphine, methyldiphenylphosphine, 4-methylphenyldiphenylphosphine, diphenylphosphine and the like.

The metal compounds useful as components of the catalyst in accordance with the present invention may be any metal compounds heretofore used alone either for the ester interchange or the condensation as well as metal compounds which are not themselves catalysts. Preferred metals are zinc, antimony, lithium, magnesium, calcium and manganese. The metals may be present as oxides or salts, such as the chlorides, acetates, propionates or other carboxylic acid salts, phosphates or hypophosphites. Mixtures of metal compounds may be used. Preferably the metal compound and the organophosphine are dissolved (either as such or by reaction) in the reaction mixture. It is desirable to have present at least ½ atom, preferably about 1 to 3 atoms, of phosphorus (from the organophosphine) per atom of metal (from the metal compound); an excess of the organophosphine may be employed, such as proportions of 5 and even 30 atoms of phosphorus (from the organophosphine) per atom of metal (from the metal compound). The amount of metal compound usually is in the range of about 0.005 to 0.5%, preferably 0.01 to 0.1%, based on the weight of the final polyester; in the preferred form, in which dimethyl terephthalate is used in the production of polyethylene terephthalate, the weight of dimethyl terephthalate used is very close to that of the final polyester and, for convenience, these same ranges may be based on the weight of the dimethyl terephthalate.

It is believed that in many cases the unexpected synergistic effects obtained by the use of the metal compound in combination with the organophosphine may be explained by the formation of a complex between these materials, which complex is more active catalytically than the individual components.

The reaction mass either for ester interchange or condensation, in addition to the reactants and catalyst, may contain additional catalysts, promoters, stabilizers (such as triphenyl phosphite), adjuvants or the like, to improve the product or to be carried along into the product for special effects.

While the invention has been described with particular reference to the production of polyethylene terephthalate, in which it finds its greatest utility, it may be used also in the manufacture of high linear polyesters (including polyether esters) derived from other glycols, and/or from other dicarboxylic acids, especially aromatic dicarboxylic acids with their carboxyl groups linked to the aromatic nucleus or nuclei in diametrically opposite positions. Examples of such other dicarboxylic acids and glycols include certain substituted terephthalic acids, diphenyl-4,4'-dicarboxylic acid, $\alpha,\beta$-diphenylethane-4,4' - dicarboxylic acid, $\alpha,\delta$-diphenylbutane-4,4'-dicarboxylic acid and other $\alpha,\omega$-diphenylalkane-4,4'-dicarboxylic acids, $\alpha,\beta$-diphenoxyethane-4,4'-dicarboxylic acid, $\alpha,\delta$-diphenoxybutane-4,4'-dicarboxylic acid, and other $\alpha,\omega$-diphenoxyalkane-4,4'-dicarboxylic acids; and trimethylene and propylene glycols.

The following examples are given to illustrates the invention further. In these examples, the "inherent viscosity" is equal to $$\frac{1n\eta_r}{c}$$

where $\eta_r$ is the relative viscosity (i.e. the solution/solvent viscosity ratio) and $c$ is the concentration in grams per 100 ml. of solution, the inherent viscosity in each case being measured for a solution, of concentration 0.1 g./100 ml., in a 10/7 mixture of phenol/2,4,6-trichlorophenol at 25° C. The "crystalline melting point," as used herein, is measured, in conventional manner, by observing the temperature at which the birefringence of a previously fused and solidified sample disappears. In all the examples, the reactions are carried out under an atmosphere of prepurified nitrogen (after initial purification of the reaction mixture under vacuum to removed occluded or dissolved gases); however, when the stage of condensation is reached where the pressure is reduced below about 5 mm. Hg absolute the nitrogen supply is, for convenience, cut off but is resumed when the pressure is allowed to rise at the conclusion of the process.

*Example I*

(a) 100 parts by weight of dimethyl terephthalate and 67 parts of ethylene glycol are heated with 0.1 part of triphenyl phosphine for 3 hours at 180–200° C. at atmospheric pressure in a vessel equipped with a condenser to liquefy and remove any methanol evolved. Substantially no methanol is obtained, indicating no ester interchange.

(b) 100 parts by weight of dimethyl terephthalate and 67 parts of ethylene glycol are melted together with 0.05 part of zinc oxide. After 2 hours of heating at 180–200° C. substantially no methanol is evolved.

(c) The reaction mixture in (b) is cooled, 0.1 part of triphenyl phosphine is added and the mass is again heated at 180–200° C. at atmospheric pressure. After 2 hours 85% of the theoretical amount of methanol is recovered. The temperature is then raised to 275–280° C. and held for approximately one hour. At this stage reduced pressure is applied and the polycondensation is carried out at a pressure below 4 mm. Hg absolute at 280–290° C. while ethylene glycol is removed. After three hours a viscous polymer is obtained which, upon cooling, has excellent color and an inherent viscosity of 0.4. The polymer has a crystalline melting point of 259° C. and can be melt spun into strong filaments of excellent color.

*Example II*

196 parts of dimethyl terephthalate are heated at 180° C. for 1¾ hours at atmospheric pressure with 130 parts of ethylene glycol, 0.11 part zinc oxide and 0.11 part triphenyl phosphine, while methanol is removed by distillation. The temperature is then raised to 275° C. for one hour at atmospheric pressure, after which the pressure is reduced, over 30 minutes, to 2–5 mm., at a temperature of 275 to 280° C., this pressure being maintained for four hours, at a temperature of 280° C. A white polymer of inherent viscosity 0.51 is obtained.

*Example III*

(a) 100 parts of dimethyl terephthalate, 67 parts of ethylene glycol, 0.05 part of zinc chloride and 0.1 part of triphenyl phosphine are melted together. The mass is agitated and the temperature slowly raised to 180° C. at atmospheric pressure for the removal of methanol. After two hours the removal of methanol ceases. The temperature is raised to 275–280° C. and held one hour for the partial removal of excess glycol. At this stage reduced pressure is applied and the polycondensation is carried out at a pressure below 3 mm. Hg absolute at 280° C. After only one hour a viscous polymer is obtained having an inherent viscosity of 0.59 and a crystalline melting point of 258° C. The polymer can be melt-spun into filaments which have excellent color and good tensile properties.

(b) Example III(a) is repeated except that the reduced pressure is continued for 2 hours. The results are the same as in Example III(a), but the inherent viscosity is 0.65.

By way of comparison, zinc chloride alone gives cream colored polymers and much slower polycondensation under the same experimental conditions.

*Example IV*

Example III(b) is repeated except that 0.7 part of triphenyl phosphite is added just before the temperature is raised to 275–280° C. A white polymer of high inherent viscosity is obtained.

*Example V*

100 parts of dimethyl terephthalate, 65 parts of ethylene glycol, 0.02 part of zinc acetate dihydrate and 0.06 part triphenyl phosphine are mixed together, and heated to 180° C.; methanol is evolved from the agitated, clear melt. Removal of 85% of the theoretical yield of methanol at 180–190° C. requires approximately 2 hours. The temperature is raised to 280° C. in 1.5 hours at atmospheric pressure. At this stage the pressure is reduced to less than 2 mm. Hg absolute over a period of 0.5 hour and, after only 3.5 additional hours at 280° C., a viscous polymer is formed. The melt and the solid polymer show excellent color, an inherent viscosity of 0.64 and a crystalline melting range of 256–266° C. The polymer can be spun into strong filaments having excellent color.

*Example VI*

100 parts of dimethyl terephthalate and 64 parts of ethylene glycol are melted together and then agitated with 0.05 part of lithium acetate and 0.075 part triphenyl phosphine at atmospheric pressure. The temperature is raised to 175–180° C. for 1½ hours for the removal of methanol (approximately 90% of the theoretical). The temperature is raised to 275–280° C. for 1 hour and the pressure subsequently reduced to 2–3 mm. Hg absolute at the same temperature. After 2½ hours a viscous polymer is formed which has good color, an inherent viscosity of 0.57 and can be spun into strong filaments having excellent color.

*Example VII*

100 parts of dimethyl terephthalate and 67 parts of ethylene glycol are melted together, then stirred with 0.08 part antimony trioxide and 0.08 part triphenyl phosphine at atmospheric pressure. The temperature is raised to 180° C. for 2½ hours for the removal of methanol. The temperature is then raised to 275° C. After 1 hour the pressure is reduced to 2 to 3 mm. Hg absolute and heating continued for 4 hours. There is obtained a viscous polymer (of inherent viscosity about 0.5) having excellent color and capable of being melt spun into strong filaments of excellent color and tensile properties. Antimony trioxide by itself will not catalyze the ester interchange.

*Example VIII*

100 parts dimethyl terephthalate and 65 parts ethylene glycol are melted together, then stirred with 0.01 part $Zn(OOC—CH_3)_2—2H_2O$ and 0.05 part tri-p-biphenyl phosphine. The temperature is raised to 190° C. and in 2 hours, at atmospheric pressure, approximately 85% of the theoretical quantity of methanol has been removed. The temperature is now raised to 270° C. in ¾ hour. The pressure is then slowly reduced over a period of 1 hour; at the end of this period the pressure is 0.1 mm. Hg absolute and the temperature is 280° C. The melt is held under these conditions for 3.2 hours. A white polymer of inherent viscosity 0.52 and crystalline melting point of 256–258° C. is obtained.

*Example IX*

(a) 100 parts of dimethyl terephthalate, 67 parts of ethylene glycol and approximately 0.02 part of potassium hypophosphite are heated for a total of 7½ hours at temperatures in the range of 185–231° C. During this time only about 3 parts of methanol are evolved. Calcium hypophosphite gives similar results. Magnesium hypophosphite hexahydrate, and manganese hypophosphite monohydrate give slightly better results.

Upon raising the temperature to 235° C. and applying reduced pressure of less than 2 mm. Hg absolute considerable sublimation occurs and very little increase in viscosity is obtained.

(b) 100 parts of dimethyl terephthalate, 67 parts of ethylene glycol, 0.02 part of magnesium hypophosphite hexahydrate and 0.03 part of triphenyl phosphine are heated to 180° C. for 2½ hours during which ester exchange and removal of methanol take place, at atmospheric pressure. The temperature is raised to 275° C. for 1 hour and the pressure is then reduced to 2 mm. Hg. In 2 hours and 25 minutes a very viscous polymer (inherent viscosity above 0.5), with excellent color, is obtained.

(c) 196 parts dimethyl terephthalate, 130 parts ethylene glycol, 0.1 part of magnesium hypophosphite hexahydrate and 0.2 part of triphenylphosphine are heated to 195–210° C. for 1 hour and five minutes, during which time 90% of the theoretical methanol is removed, at atmospheric pressure. The temperature is raised to 275° C. for one hour, and reduced pressure is then applied (2 mm. Hg). In one hour and forty minutes a very viscous, white polymer of inherent viscosity 0.54 is obtained.

(d), (e) Example IX(b) is repeated, substituting each of manganese hypophosphite monohydrate and calcium hypophosphite for the magnesium hypophosphite, respectively.

In the above examples, atmospheric pressure is used unless the contrary is specified. When the pressure is reduced to a low value this is done gradually to avoid driving off low molecular weight condensation products, while reaction is taking place, in a manner well known to the art.

It is to be understood that the foregoing detailed description is given merely by way of illustration and that many variations may be made therein without departing from the spirit of my invention.

Having described my invention what I desire to secure by Letters Patent is:

1. In the process for the production of linear fiber-forming high polyesters by the condensation of an ester of a dicarboxylic acid free of ethylenic unsaturation and a glycol with liberation of the glycol, the improvement which comprises effecting the condensation in the presence of a metal compound of the group consisting of oxides, chlorides, carboxylic acid salts, phosphates and hypophosphites of zinc, antimony, lithium, magnesium, calcium and manganese and a tertiary organophosphine, said metal compound being present in an amount between 0.005 and about 0.5% based on the weight of the polyester and said organophosphine being present in an amount sufficient to provide from ½ to 30 atoms of phosphorus per atom of metal in said metal compound.

2. In the process for the production of linear fiber-forming high polyesters by the condensation of an ester of a dicarboxylic acid free of ethylenic unsaturation and a glycol with liberation of the glycol at a temperature above 255° C., the improvement which comprises effecting the condensation in the presence of a metal compound and a tertiary organophosphine, said metal compound of the group consisting of oxides, chlorides, carboxylic acid salts, phosphates and hypophosphites of zinc, antimony, lithium, magnesium, calcium and manganese being present in an amount between about 0.005 and about 0.5% based on the weight of the polyester and said organophosphine being present in an amount sufficient to provide from ½ to 30 atoms of phosphorus per atom of metal in said metal compound.

3. In the process for the production of linear fiber-forming high polyesters by the condensation of an ester of terephthalic acid and ethylene glycol with liberation of the glycol, the improvement which comprises effecting the condensation in the presence of a metal compound of the group consisting of oxides, chlorides, carboxylic acid salts, phosphates and hypophosphites of zinc, antimony, lithium, magnesium, calcium and manganese and a tertiary organophosphine, said metal compound being present in an amount between about 0.005 and about 0.5% based on the weight of the polyester and said organophosphine being present in an amount sufficient to provide from ½ to 30 atoms of phosphorus per atom of metal in said metal compound.

4. In the process for the production of linear fiber-forming high polyesters by the condensation of an ester of terephthalic acid and ethylene glycol with liberation of the glycol, the improvement which comprises effecting the condensation in the presence of triphenyl phosphine and zinc oxide to catalyze said reaction, said zinc oxide being present in an amount between about 0.005 and about 0.5% based on the weight of the polyester and said triphenyl phosphine being present in an amount sufficient to provide ½ to 30 atoms of phosphorus per atom of zinc in said zinc oxide.

5. In the process for the production of linear fiber-forming high polyesters by the condensation of an ester of terephthalic acid and ethylene glycol with liberation of the glycol, the improvement which comprises effecting the condensation in the presence of triphenyl phosphine and zinc chloride to catalyze said reaction, said zinc chloride being present in an amount between about 0.005 and about 0.5% based on the weight of the polyester and said triphenyl phosphine being present in an amount sufficient to provide ½ to 30 atoms of phosphorus per atom of zinc in said zinc chloride.

6. In the process for the production of linear fiber-forming high polyesters by the condensation of an ester of terephthalic acid and ethylene glycol with liberation of the glycol, the improvement which comprises effecting the condensation in the presence of triphenyl phosphine and zinc acetate to catalyze said reaction, said zinc acetate being present in an amount between about 0.005 and about 0.5% based on the weight of the polyester and said triphenyl phosphine being present in an amount sufficient to provide ½ to 30 atoms of phosphorus per atom of zinc in said zinc acetate.

7. In the process for the production of linear fiber-forming high polyesters by the condensation of an ester of terephthalic acid and ethylene glycol with liberation of the glycol, the improvement which comprises effecting the condensation in the presence of triphenyl phosphine and lithium acetate to catalyze said reaction, said lithium acetate being present in an amount between about 0.005 and about 0.5% based on the weight of the polyester and said triphenyl phosphine being present in an amount sufficient to provide ½ to 30 atoms of phosphorus per atom of lithium in said lithium acetate.

8. In the process for the production of linear fiber-forming high polyesters by the condensation of an ester of terephthalic acid and ethylene glycol with liberation of the glycol, the improvement which comprises effecting the condensation in the presence of triphenyl phosphine and antimony oxide to catalyze said reaction, said antimony oxide being present in an amount between about 0.005 and about 0.5% based on the weight of the polyester and said triphenyl phosphine being present in an amount sufficient to provide ½ to 30 atoms of phosphorus per atom of antimony in said antimony oxide.

9. In the process for the production of linear fiber-forming high polyesters by the condensation of an ester of terephthalic acid and ethylene glycol with liberation of the glycol, the improvement which comprises effecting the condensation in the presence of triphenyl phosphine and calcium hypophosphite to catalyze said reaction, said calcium hypophosphite being present in an amount between about 0.005 and about 0.5% based on the weight of the polyester and said triphenyl phosphine being present in an amount sufficient to provide ½ to 30 atoms of phosphorus per atom of calcium in said calcium hypophospite.

10. In the process for the production of linear fiber-forming high polyesters by the condensation of an ester of terephthalic acid and ethylene glycol with liberation of the glycol, the improvement which comprises effecting the condensation in the presence of tri(biphenyl) phosphine and zinc acetate to catalyze said reaction, said zinc acetate being present in an amount between about 0.005 and about 0.5% based on the weight of the polyester and said tri(biphenyl) phosphine being present in an amount sufficient to provide ½ to 30 atoms of phosphorus per atom of zinc in said zinc acetate.

11. In the production of linear fiber-forming high polyesters by a process comprising the steps of effecting ester-interchange between dimethyl terephthalate and ethylene glycol, with splitting off of methanol, followed by polycondensation of the product of the ester-interchange reaction to produce said high polyester, the improvement which comprises effecting said process in the presence of a metal compound of the group consisting of oxides, chlorides, carboxylic acid salts, phosphates and hypophosphites of zinc, antimony, lithium, magnesium, calcium and manganese and a tertiary organophosphine, said metal compound being present in an amount between about 0.005 and about 0.5% based on the weight of the polyester and said organophosphine being present in an amount sufficient to provide from ½ to 30 atoms of phosphorus per atom of metal in said metal compound.

12. In the process for the production of a linear fiber-forming high polyester by heating bis-2-hydroxyethyl terephthalate to effect polycondensation, at least a portion of the polycondensation being effected at a temperature of about 255 to 290° C., the improvement which comprises effecting polycondensation in the presence of a catalytic proportion of a mixture of a tertiary organophosphine and a metal compound of the group consisting of oxides, chlorides, carboxylic acid salts, phosphates, and hypophosphites of zinc, antimony, lithium, magnesium, calcium and manganese, the amount of metal compound being about 0.005 to 0.5%, based on the weight of the polyester, and there being at least ½ atom of the phosphorus of the organophosphine per atom of the metal of said metal compound.

13. In the process for the production of linear fiber-forming high polyesters by the condensation of an ester of terephthalic acid and ethylene glycol, the improvement which comprises effecting the condensation in the presence of triphenyl phosphine and manganese hypophosphite to catalyze said reaction, said manganese hypophosphite being present in an amount between about 0.005 and about 0.5% based on the weight of the polyester and said triphenyl phosphine being present in an amount sufficient to provide ½ to 30 atoms of phosphorus per atom of manganese in said manganese hypophosphite.

14. In the process for the production of linear fiber-forming high polyesters by the condensation of an ester of terephthalic acid and ethylene glycol, the improvement which comprises effecting the condensation in the presence of triphenyl phosphine and magnesium hypophosphite to catalyze said reaction, said magnesium hypophosphite being present in an amount between about 0.005 and about 0.5% based on the weight of the polyester and said triphenyl phosphine being present in an amount sufficient to provide ½ to 30 atoms of phosphorus per atom of magnesium in said manganesium hypophosphite.

References Cited in the file of this patent

UNITED STATES PATENTS

| | | |
|---|---|---|
| 1,990,609 | Meis | Feb. 12, 1935 |
| 2,368,866 | Mygaard et al. | Feb. 6, 1945 |
| 2,437,795 | Walling | Mar. 16, 1948 |
| 2,543,635 | Loritsch | Feb. 27, 1951 |
| 2,543,636 | Loritsch | Feb. 27, 1951 |
| 2,584,112 | Brown | Feb. 5, 1952 |
| 2,650,213 | Hofrichter | Aug. 25, 1953 |
| 2,822,376 | Hechenbleikner et al. | Feb. 4, 1958 |
| 2,848,437 | Langsdorf | Aug. 19, 1958 |
| 2,894,936 | Benson | July 14, 1959 |

OTHER REFERENCES

Karrer: Organic Chemistry, published 1946; Elsevier Publishing Co., Inc., New York, N.Y. 2nd ed., p. 135.

Kosalapoff: Organo-Phosphorus Compounds, page 24, published 1950 by John Wiley & Sons, New York, N.Y.